United States Patent
Kumaresan Nair et al.

(10) Patent No.: US 11,222,376 B2
(45) Date of Patent: Jan. 11, 2022

(54) INSTANT OFFER DISTRIBUTION SYSTEM

(71) Applicant: eBay Inc., San Jose, CA (US)

(72) Inventors: Satheesh Kumaresan Nair, Santa Clara, CA (US); Bhupendra Jain, Santa Clara, CA (US)

(73) Assignee: eBay Inc., an Jose, CA (US)

( * ) Notice: Subject to any disclaimer, the term of this patent is extended or adjusted under 35 U.S.C. 154(b) by 287 days.

(21) Appl. No.: 16/028,497

(22) Filed: Jul. 6, 2018

(65) Prior Publication Data
US 2020/0013103 A1    Jan. 9, 2020

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC ........... G06Q 30/0601–30/0645; G06Q 30/80; G06Q 30/0631
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 6,873,968 B2 | 3/2005 | Ehrlich et al. | |
| 7,860,780 B1 | 12/2010 | Cooper et al. | |
| 8,041,611 B2 | 10/2011 | Kleinrock et al. | |
| 8,315,919 B1 | 11/2012 | Perrochon et al. | |
| 2006/0173773 A1 | 8/2006 | Ettinger, Jr. | |
| 2007/0055568 A1 | 3/2007 | Osborn | |
| 2008/0004981 A1 | 1/2008 | Gopalpur et al. | |
| 2013/0179270 A1* | 7/2013 | Nolan ................ | G06Q 30/0601 705/14.66 |
| 2014/0019257 A1 | 1/2014 | Chatter et al. | |
| 2014/0172611 A1 | 6/2014 | Kaushik et al. | |
| 2014/0278804 A1* | 9/2014 | Lanxner ............. | G06Q 30/0206 705/7.35 |

(Continued)

FOREIGN PATENT DOCUMENTS

| | | |
|---|---|---|
| WO | 2001/033464 A1 | 5/2001 |
| WO | 2020/009852 A1 | 1/2020 |

OTHER PUBLICATIONS

W. Lee and L. Liu, "Developing Mobile Agent-Based Systems for Mobile Commerce," 2006 IEEE International Conference on Systems, Man and Cybernetics, 2006, pp. 3778-3783, doi: 10.1109/ICSMC.2006.384718. (Year: 2006).*

(Continued)

*Primary Examiner* — Anand Loharikar
(74) *Attorney, Agent, or Firm* — chwegman und erg & Woessner, P.A.

(57) ABSTRACT

A real-time negotiation system to provide functionality to generate and cause display of specially configured graphical user interface for real-time negotiation within a networked marketplace. According to certain example embodiments, aspects of the real-time negotiation systems include various functional components to perform operations that include receiving a signal from a user, via a first client device, wherein the signal indicates an implicit interest in a first item that comprises a set of item attributes.

12 Claims, 12 Drawing Sheets

(56) References Cited

U.S. PATENT DOCUMENTS

2014/0358716 A1\* 12/2014 Kaufeldt ............ G06Q 30/0611
705/26.4
2015/0348169 A1  12/2015 Harris
2016/0162925 A1\*  6/2016 Sundaresan ........ G06Q 30/0222
705/14.23

OTHER PUBLICATIONS

International Search Report Received for PCT Application No. PCT/US2019/039168, dated Oct. 24, 2019, 3 pages.
International Written Opinion Received for PCT Application No. PCT/US2019/039168, dated Oct. 24, 2019, 7 pages.
International Preliminary Report on Patentability Received for PCT Patent Application No. PCT/US2019/039168, dated Jan. 21, 2021, 9 Pages.

\* cited by examiner

INSTANT OFFER DISTRIBUTION SYSTEM

TECHNICAL FIELD

The subject matter of the present disclosure generally relates to methods and systems supporting the presentation of notifications.

BACKGROUND

Computerized marketplaces enjoy widespread use. Such marketplaces may comprise formats that include simple classified ads and bulletin boards, to more advanced systems which facilitate auction format listings. The models for transactions conducted through such marketplaces include fixed price, peer-to-peer bidding, volume purchasing, and bid and lock models. These models, as well as others, have been in use for many years and have been widely successful.

While these models provide significant advantages and benefits over traditional brick-and-mortar merchandizing, there remain a number of limitations. Computerized marketplaces, while convenient, are also impersonal and lack the ability to address individuals viewing or searching for goods or services, in real-time.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
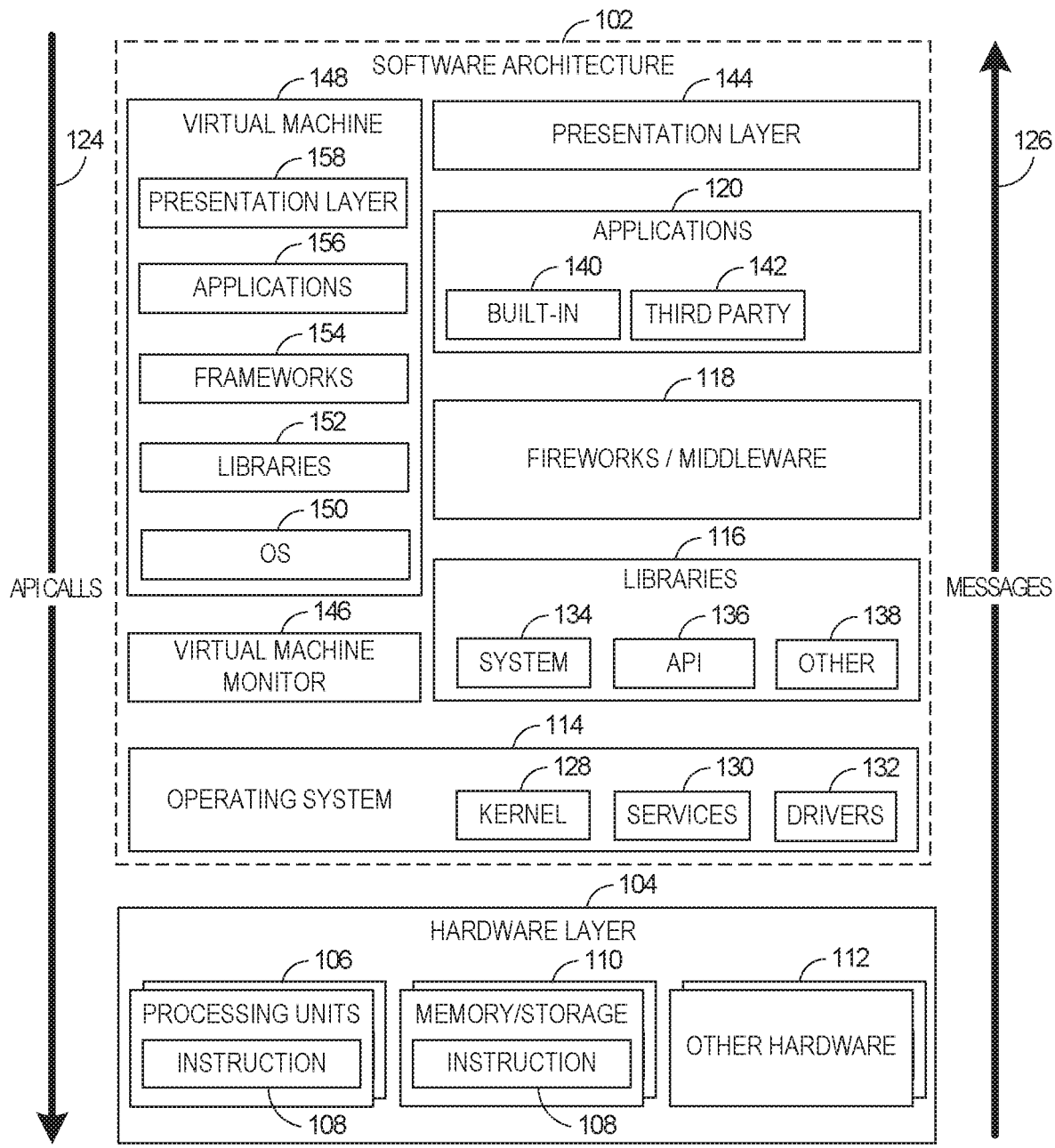
FIG. 1 is a block diagram illustrating an example of a software architecture that may be installed on a machine, according to some example embodiments.

There are no present systems in place to enable users to negotiate instantly with and purchase items from a seller in real-time through an online marketplace. The proposed system addresses the above limitations by providing enhanced graphical user interfaces (GUI) that include a complementary system for instant negotiation, in real-time, for online marketplaces. The system enables sellers to opt-in and support instant shopping for their listings, during preferred hours or based on predefined criteria. For items backed by instant sellers, shoppers find an extra option to request an instant deal. When the system receives an instant deal request, it notifies one or more available instant sellers with request details that may include shopper information, quantity, specifics, current listing price and best market price known for that item. The notification client shows a countdown timer to all notified sellers with options for adjusting their best deal. If seller does not adjust any options, the original listing is used to return a default deal. The system analyzes all seller deals, selects the best one based on a range of criteria and returns the selected deal to the shopper, with options to view the next best deals at 2nd, 3rd place, etc. The system may display geo-locations of sellers and other comparative prices to help an instant shopper make a quick buying decision.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Below are described various aspects of a real-time negotiation system that may be utilized to provide functionality to generate and cause display of specially configured GUI for real-time negotiation within a networked marketplace. According to certain example embodiments, aspects of the real-time negotiation systems include various functional components to perform operations that include receiving a signal from a user, via a first client device, wherein the signal indicates an implicit interest in a first item that comprises a set of item attributes. In traditional online and networked marketplaces, users may shop for and purchase items through item listings generated by sellers and presented by the networked marketplace. In such systems, a seller may never have any awareness or knowledge that a user is actively searching for a particular item. The disclosed system provides functionality to enable users to interact with one another in real-time based on the detection of an "implicit interest" in an item or attribute of an item.

An "explicit interest" may be determined based on explicit inputs received from users, such as inputs that add an item to a shopping cart, inputs that cause a purchase or request for a purchase of an item, or inputs that provide a "like" or a "share" of an item via a social media network. Explicit inputs are therefore based on "explicit" user behaviors. An implicit interest, on the other hand, may therefore include inputs that do not explicitly or expressly indicate an interest in an item based on the above-mentioned explicit inputs. For example, an "implicit interest" may be determined based on implicit user inputs that include searching for an item, or viewing an item listing that depicts an item.

In some embodiments, in response to receiving a signal indicating the implicit interest in the item (e.g., a search request), the real-time negotiation system identifies a plurality of pages (e.g., item listings) based on at least a portion of the item attributes of the first item. For example, the plurality of pages may include a first page associated with a first item, and a second page associated with a second item, wherein the first item and second item each include one or more of the item attributes of the item that the user has implicitly expressed an interest in.

The real-time negotiation system retrieves user accounts associated with the first page and the second page, and in response to identifying the plurality of pages that include the first page and second page, causes display of a notification at devices associated with the user accounts, wherein the notification includes a request to provide adjustments to the corresponding pages. For example, the adjustments may include a change in a value associated with the items depicted by the pages, an addition of an incentive to the pages, as well as an adjustment to one or more of the attributes of the items a quantity, a delivery date, etc.).

In response to receiving the adjustments to the pages, the real-time negotiation system causes display of a presentation of the adjusted pages at the first client device of the user, wherein the presentation of the adjusted pages is based on the adjustments to the pages received from the corresponding user account. The presentation may include an indication that one or more attributes of items depicted by the pages have been changed (e.g., reduced price). In some embodiments, the real-time negotiation system may select a page from among the plurality of pages based on an evaluation of the adjustments received from the corresponding user accounts. For example, the evaluation may be a comparison of one or more specific attributes of the pages after the adjustments have been applied to the pages.

The presentation of the adjusted page may additionally include an indication of a period for reply by the user (e.g., 60 seconds). For example, receiving the adjustment to the one or more attributes of the items depicted by the plurality of the pages may also include receiving a definition of a period to reply. The period to reply may be a time period in which the user at the first client device must either accept or reject terms of an adjusted page.

FIG. 1 is a block diagram illustrating an example of a software architecture that may be installed on a machine, according to some example embodiments. FIG. 1 is merely a non-limiting example of a software architecture, and it will be appreciated that many other architectures may be implemented to facilitate the functionality described herein. The software architecture 102 may be executing on hardware such as a machine 1100 of FIG. 11 that includes, among other things, processors 1110, memory 1130, and I/O components 1150. A representative hardware layer 104 is illustrated and can represent, for example, the machine 1100 of FIG. 11. The representative hardware layer 104 comprises one or more processing units 106 having associated executable instructions 108. The executable instructions 108 represent the executable instructions of the software architecture 102, including implementation of the methods, modules, interfaces, and so forth of FIGS. 2-9. The hardware layer 104 also includes memory or storage modules 110, which also have the executable instructions 108. The hardware layer 104 may also comprise other hardware 112, which represents any other hardware of the hardware layer 104, such as the other hardware illustrated as part of the machine 100.

In the example architecture of FIG. 1, the software architecture 102 may be conceptualized as a stack of layers, where each layer provides particular functionality. For example, the software architecture 102 may include layers such as an operating system 114, libraries 116, frameworks/middleware 118, applications 120, and a presentation layer 1044. Operationally, the applications 120 or other components within the layers may invoke API calls 124 through the software stack and receive a response, returned values, and so forth (illustrated as messages 126) in response to the API calls 124. The layers illustrated are representative in nature, and not all software architectures have all layers. For example, some mobile or special purpose operating systems may not provide a frameworks/middleware 118 layer, while others may provide such a layer. Other software architectures may include additional or different layers.

The operating system 114 may manage hardware resources and provide common services. The operating system 114 may include, for example, a kernel 128, services 130, and drivers 132. The kernel 128 may act as an abstraction layer between the hardware and the other software layers. For example, the kernel 128 may be responsible for memory management, processor management (e.g., scheduling), component management, networking, security settings, and so on. The services 130 may provide other common services for the other software layers. The drivers 132 may be responsible for controlling or interfacing with the underlying hardware. For instance, the drivers 132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 116 may provide a common infrastructure that may be utilized by the applications 120 and/or other components and/or layers. The libraries 116 typically provide functionality that allows other software modules to perform tasks in an easier fashion than by interfacing directly with the underlying operating system 114 functionality (e.g., kernel 128, services 130, or drivers 132). The libraries 116 may include system 134 libraries (e.g., C standard library) that may provide functions such as memory allocation functions, string manipulation functions, mathematic functions, and the like. In addition, the libraries 116 may include API libraries 136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 116 may also include a wide variety of other libraries 138 to provide many other APIs to the applications 120 and other software components/modules.

The frameworks 118 (also sometimes referred to as middleware) may provide a higher-level common infrastructure that may be utilized by the applications 120 or other software components/modules. For example, the frameworks 118 may provide various graphic user interface (GUI) functions, high-level resource management, high-level location services, and so forth. The frameworks 118 may provide a broad spectrum of other APIs that may be utilized by the applications 120 and/or other software components/modules, some of which may be specific to a particular operating system or platform.

The applications 120 include built-in applications 140 and/or third party applications 142. Examples of representative built-in applications 140 may include, but are not limited to, a contacts application, a browser application, a book reader application, a location application, a media application, a messaging application, or a game application. The third party applications 142 may include any of the built-in applications, as well as a broad assortment of other applications. In a specific example, the third party application 142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 142 may invoke the API calls 124 provided by the mobile operating system such as the operating system 114 to facilitate functionality described herein.

The applications 120 may utilize built-in operating system functions (e.g., kernel 128, services 130, or drivers 132), libraries (e.g., system 134, APIs 136, and other libraries 138), or frameworks/Middleware 118 to create user interfaces to interact with users of the system. Alternatively, or additionally, in some systems, interactions with a user may occur through a presentation layer, such as the presentation layer 144. In these systems, the application/module "logic" can be separated from the aspects of the application/module that interact with the user.

Some software architectures utilize virtual machines. In the example of FIG. 1, this is illustrated by a virtual machine 148. A virtual machine creates a software environment where applications/modules can execute as if they were executing on a hardware machine e.g., the machine 100 of FIG. 1, for example). A virtual machine is hosted by a host operating system (e.g., operating system 114) and typically, although not always, has a virtual machine monitor 146, which manages the operation of the virtual machine as well as the interface with the host operating system (e.g., operating system 114). A software architecture executes within the virtual machine 148, such as an operating system 150, libraries 152, frameworks/middleware 154, applications 156, or a presentation layer 158. These layers of software architecture executing within the virtual machine 148 can be the same as corresponding layers previously described or may be different.

Figure 2:
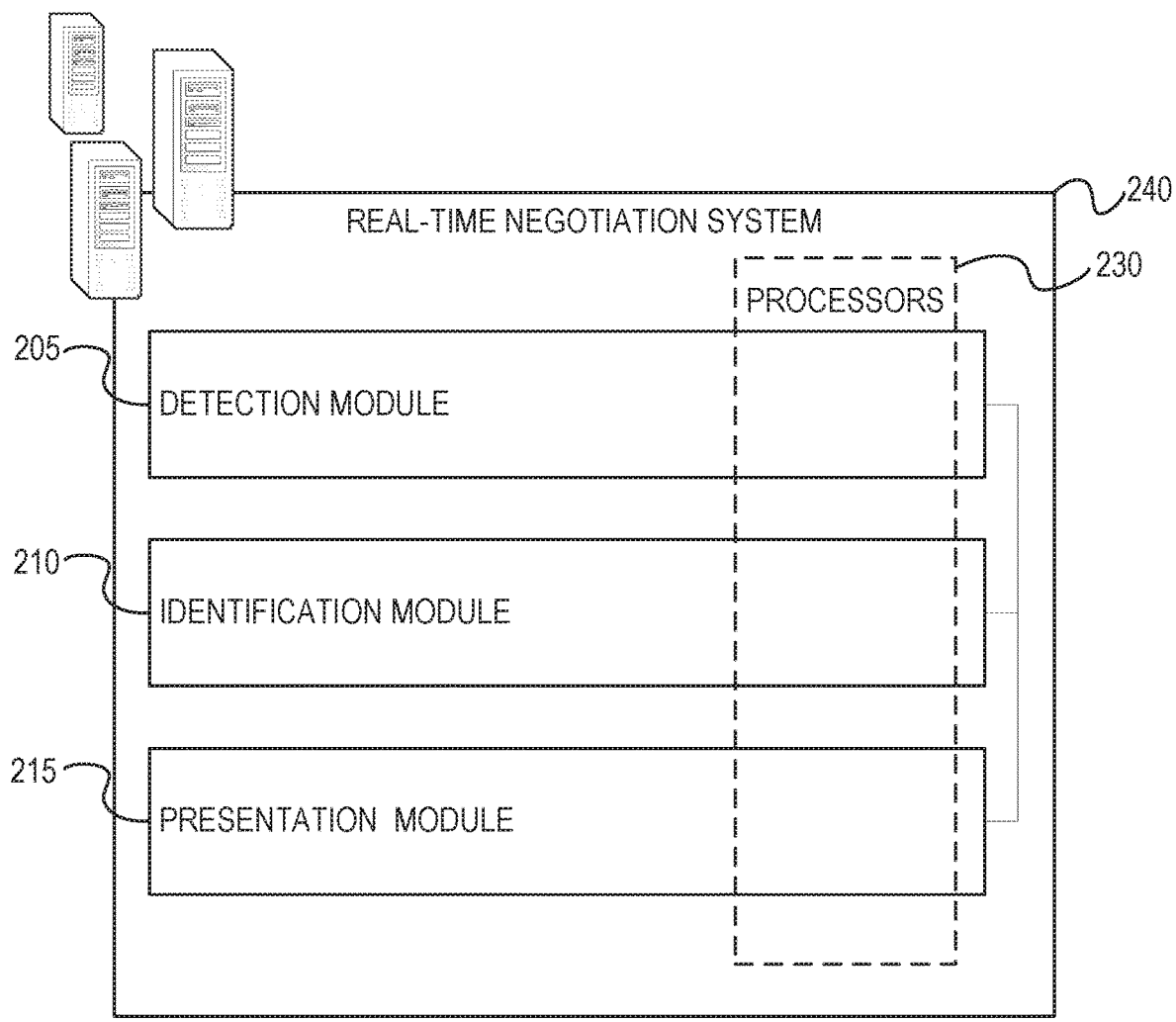
FIG. 2 is a block diagram illustrating various functional components of a real-time negotiation system, which is provided as part of the networked system, according to example embodiments.

FIG. 2 is a block diagram illustrating components of a real-time negotiation system 240 that provide functionality to detect a signal of an implicit interest in an item that comprises a set of item attributes from a client device, identify a plurality of pages based on the item attributes of the item, wherein each of the plurality of pages are associated with user accounts, cause display of a prompt at the user accounts associated with the plurality of pages, receive an adjustment to be applied to at least a portion of the plurality of pages from the associated user accounts, select one or more pages from among the plurality of pages based on the an evaluation of the adjustments, and display a presentation of the selected pages at the client device, wherein the presentation of the selected pages is based on the adjustments, according to certain example embodiments. The real-time negotiation system 240 is show as including a detection module 205, a key policy module 210, and a communication module 215, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module described of the automated key and encryption system 240 may physically include an arrangement of one or more of the processors 230 (e.g., a subset of or among the one or more processors of the machine) configured to perform the operations described herein for that module. As another example, any module of the automated key and encryption system 240 may include software, hardware, or both, that configure an arrangement of one or more processors 230 (e.g., among the one or more processors of the machine) to perform the operations described herein for that module. Accordingly, different modules of the automated key and encryption system 240 may include and configure different arrangements of such processors 230 or a single arrangement of such processors 230 at different points in time. Moreover, any two or more modules of the automated key and encryption system 240 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
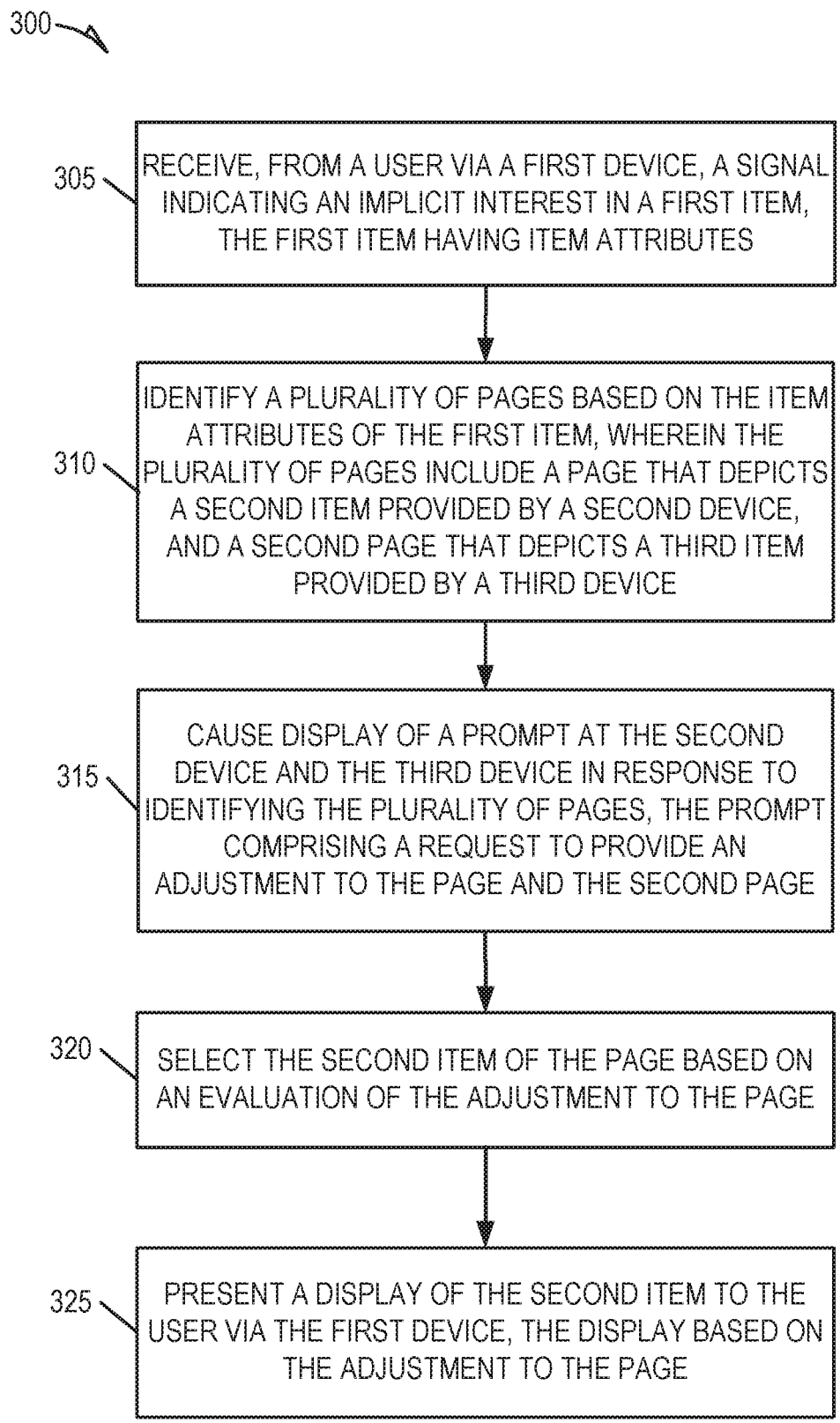
FIG. 3 is a flowchart illustrating a method for generating and presenting various interfaces to facilitate real-time negotiation within a networked marketplace, according to an example embodiment.

FIG. 3 is a flowchart illustrating a method 300 for generating and presenting various interfaces to facilitate real-time negotiation within a networked marketplace, according to an example embodiment. The method 300 may be embodied in computer-readable instructions for execution by one or more processors (e.g., processors 230 of FIG. 2) such that the steps of the method 300 may be performed in part or in whole by functional components (e.g., modules) of a client device or the real-time negotiation system 240; accordingly, the method 300 is described below by way of example with reference thereto. However, it shall be appreciated that the method 300 may be deployed on various other hardware configurations and is not intended to be limited to the functional components of the client device or the real-time negotiation system 240.

At operation 305, the detection module 205 receives, from a user via a first device in communication with the real-time negotiation system 240, a signal indicating an implicit interest in a firm item that comprises a set of item attributes. For example, the user may browse or search for the item via a search interface, or may display content or publications associated with the item, such as an item listing, or image. The signal that indicates the implicit interest may include a search request received from the first device, wherein the search request identifies the first item (or attributes of the first item), or in further embodiments, may comprise a request from the first device to display content such as an item listing that includes a depiction of the first item.

In response to the detection module 205 receiving the signal indicating the implicit interest in the first item, at operation 310, the identification module 210 identifies a plurality of pages (e.g., item listings) based on the implicit interest in the first item. For example, the identification module 210 may perform a search query of a database to identify one or more item listings based on item attributes of the first item. Each page from among the plurality of pages may depict items similar to or related to the first item based on the item attributes of the first item, and each page may additionally include an identification of a user (e.g., a seller) associated with the page.

In response to the identification module 210 identifying the plurality of pages based on the implicit interest in the first item, at operation 315 the presentation module 215 generates and causes display of a notification (e.g., a prompt) within a GUI at one or more devices associated with each of the plurality of pages (e.g., a second device and a third device), wherein the notification includes a request to provide an adjustment to attributes of one or more of the plurality of pages.

In some embodiments, the presentation module 215 may cause display of the notification within the GUI at the one or more devices associated with each of the plurality of pages based on an availability of the one or more devices. For example, a seller associated with the one or more devices may provide an input that defines a schedule of availability, wherein notification may only be received during a time period defined by the schedule of availability.

For example, the plurality of pages may include a page that depicts a second item, and a second, distinct page that depicts a third item, wherein the second item and third item share at least a portion of the item attributes of the first item (i.e., are similar to the first item). The page may be associated with a second device that generated and published the page, and the second page may be associated with a third device. The presentation module 215 generates and causes display of a prompt within a GUI displayed at the second device and third device, wherein the prompt includes a request to provide an adjustment to attributes of the pages, such as a price of the items, a shipping rate of the items, as well as a quantity of items. In some embodiments, the prompt may additionally include an identification of a user of the first device, as well as attributes of the user of the first device, such as a shipping address, a user identifier, a reputation score of the user. In further embodiments, the prompt may include a time period to reply to the prompt (e.g., 60 seconds), represented by a count down timer.

At operation 320, the identification module 210 selects one or more items from among the plurality of pages based on an evaluation of the adjustments received from the one or more devices associated with each of the plurality of pages. For example, the evaluation may compare the adjustments on the corresponding attributes of the items depicted by the plurality of pages. In some embodiments, the evaluation may additionally take into account a location criteria defined by a user of the first device, and location attributes associated with the one or more devices associated with each of the plurality of pages. For example, the user may indicate that they are only interested in purchasing items from sellers within a predefined radius of their location, or from sellers at certain locations. In some embodiments, the user of the first device may also provide an input that defines a maximum shipping price, wherein the shipping price is approximated based on a comparison of a location of the seller and the location of the user.

The identification module 210 may select the item corresponding to the page with the greatest change in attributes (e.g., change in price), or a change in attributes that causes a page to match or meet predefined criteria.

At operation 325, in response to the selecting the one or more items (and corresponding pages) from among the plurality of pages, the presentation module 215 presents a display of the one or more pages associated with the one or more selected items within a GUI of the first device, wherein the display of the one or more pages is based on the adjustments received from the corresponding devices. For example, a display of a page may include an item listing, wherein the attributes of the item listing are modified based on the adjustment received from the corresponding device.

Figure 4:
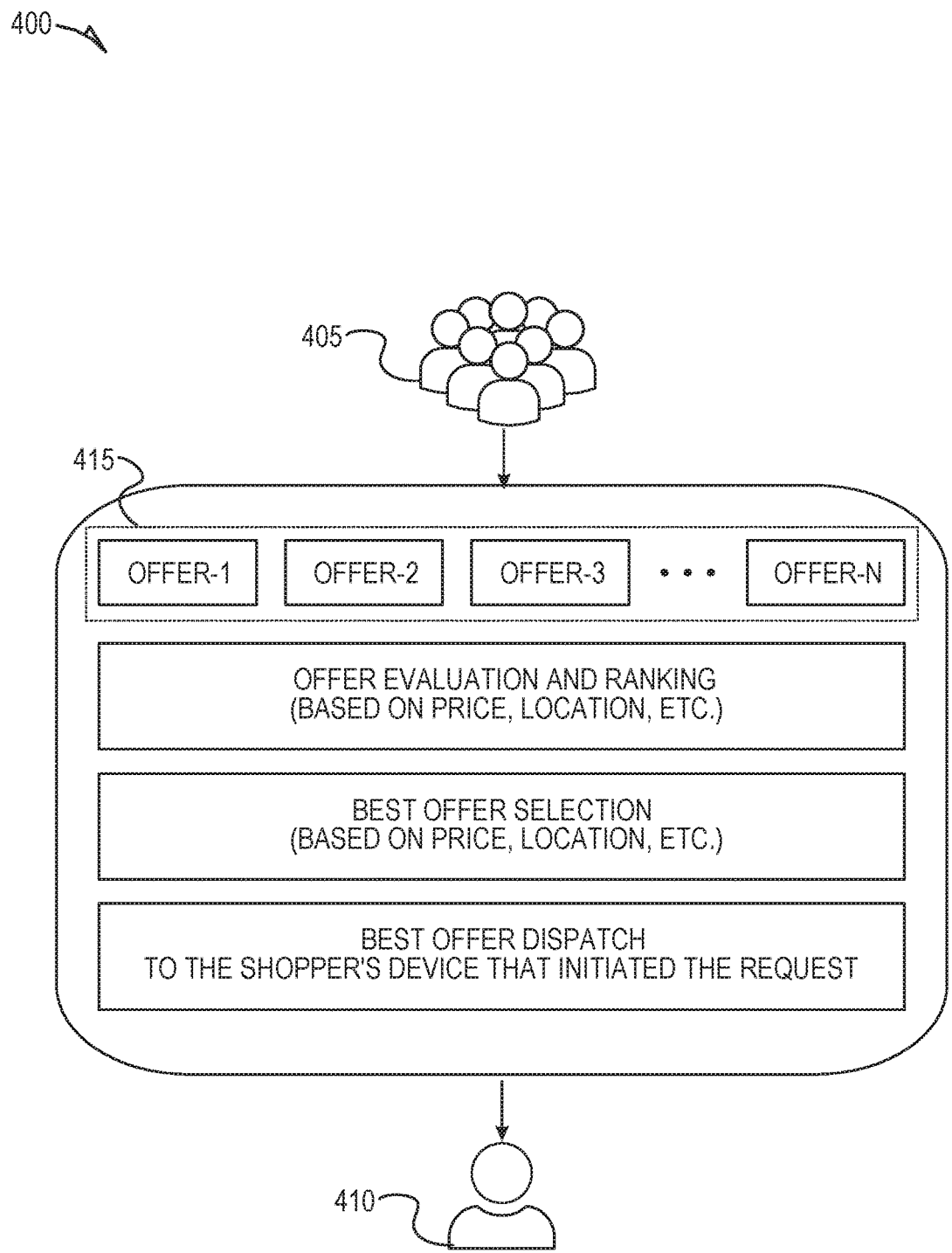
FIG. 4 is a flow diagram illustrating various operations performed by a real-time negotiation system, according to an example embodiment.

FIG. 4 is a flow-diagram 400 illustrating various operations performed by a real-time negotiation system 240, according to an example embodiment. As seen in the flow-diagram 400, a group of device 405 (e.g., sellers associated with item listings published within a networked marketplace) are notified in real-time of a shopper (e.g., the user 410) in response to the real-time negotiation system 240 receiving one or more signals that indicate an implicit interest in an item.

As described in operation 315 of the method 300, the group of devices 405 are presented within a notification in response to detecting the user 410 providing an indication of an implicit interest in one or more items associated with item listings generated and managed by the group of device 405. For example, the indication of the implicit interest may include a search query received from the user 410, wherein the search query comprises one or more item attributes of items depicted in item listings associated with the group of devices 405, as well as a signal that indicates the user 410 has viewed or displayed content related to or associated with the items depicted by the item listings generated and managed by the group of devices 405. For example, the indication of the implicit interest may include a signal that indicates the user 410 has viewed related content a requisite number of times over a predefined period (e.g., displayed an item listing that depicts an item related to item listings generated and managed by the group of device 405 three times within a 24 hour period), or for a requisite period of time within a predefined period (e.g., displayed an item listing that depicts an item related to item listings generated and managed by the group of device 405 for a total of 10 minutes over a 24 hour period).

As seen in the flow-diagram 400, the group of devices 405 may provide adjustments to corresponding item listings, wherein the adjustments are presented to the user 410 as the offers 415. Each of the offers 415 comprises an adjustment to a corresponding item listings. For example, an offer from among the offers 415 may cause an item listing to reduce a price by a percentage or numerical value (e.g., $10 off, or 10% off), or may include an addition of an incentive to the item listing (e.g., free shipping).

As discussed in operation 320 of the method 300, the identification module 210 evaluates and selects one or more pages based on the adjustments to the pages received from the corresponding client devices. The flow-diagram 400 further explains, as an illustrative example, that the identification module 210 may perform an evaluation on the plurality of pages previously identified based on the implicit interest in the first item, wherein the evaluation is based on price, location, or other item and listing attributes, and selects the "best offer" from among the set of offers 415. The presentation module 215 presents a display of the page corresponding to the best offer selected by the identification module 210, to the user 410.

Figure 5:
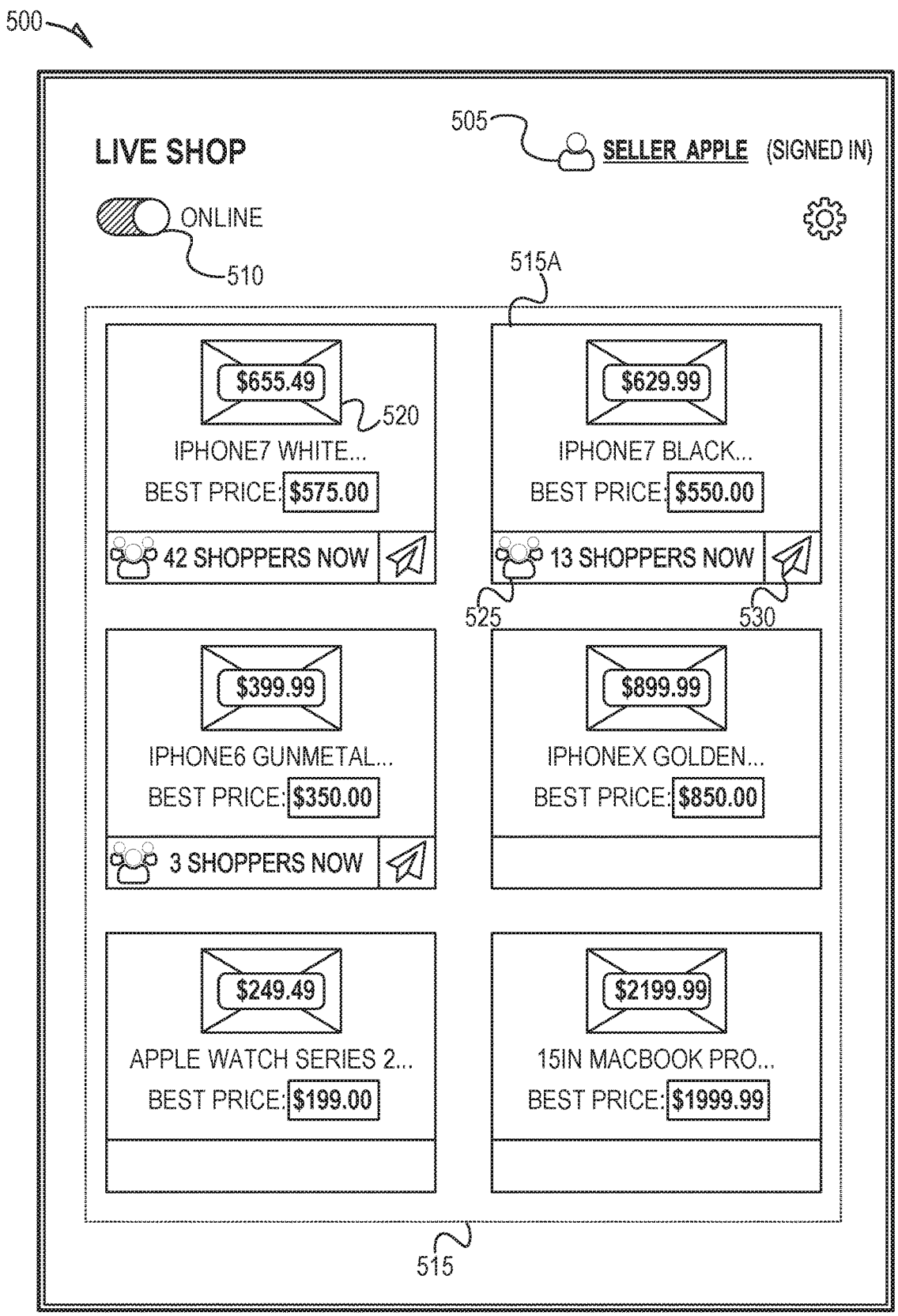
FIG. 5 is an interface diagram illustrating an interface presented by a real-time negotiation system, according to an example embodiment.

FIG. 5 is an interface diagram illustrating an interface 500 presented by a real-time negotiation system 240, according to an example embodiment. As seen in FIG. 5, the interface 500 may include a display of a seller identifier of a seller 505, a display of a toggle switch 510, and a presentation of a set of item listings 515 that depict one or more items listed for sale by the seller 505.

The interface 500 comprises a display of a GUI to enable a seller 505 to provide an input to turn on and off the real-time negotiation features of the real-time negotiation system 240. The interface 500 includes a display of a toggle switch 510, wherein the seller 505 may provide an input to the toggle switch 510 to "opt-in" to the real-time negotiation features of the real-time negotiation system 240. By setting the toggle switch 510 to the "online" position, the seller 505 allows the real-time negotiation system 240 to notify the seller 505 in response to signals indicating an implicit interest in one or more items depicted by the item listings 515 of the seller 505. In some embodiments, the real-time negotiation system 240 may cause display of an "online" notification on one or more item listings generated by the seller 505, in response to the seller 505 setting the toggle switch 510 to the "online" position.

As seen in the interface 500, each of the item listings 515 may include a display of item attributes 520 (e.g., a price, a listing title), as well as an indication 525 of a number of shoppers that have provided an input that represents an implicit interest in an item corresponding to the item listing.

Consider an illustrative example from the perspective of the seller 505. The seller 505 may display the interface 500 and provide an input to the toggle switch 510 to active real-time negotiation features of the real-time negotiation system 240. In response to receiving the input to the toggle switch 510, the real-time negotiation system 240 update the display of the item listings 515 associated with the seller 505, by displaying a number of shoppers that have expressed an implicit interest in an item depicted by an item listing. For example, as seen in FIG. 5, 42 shoppers have expressed an implicit interest in the item listing 515A. The seller 505 may provide an input into the icon 530 in order to provide an adjustment to one or more attributes of the item listing 515A.

Figure 6:
FIG. 6 is an interface diagram illustrating an interface presented by a real-time negotiation system, according to an example embodiment.

FIG. 6 is an interface diagram illustrating an interface 600 presented by a real-time negotiation system 240, according to an example embodiment. As seen in FIG. 6, the interface 600 may include a display of a schedule configuration interface 605, and an automated adjustment interface 610, for a user (e.g., the seller 505) to define periods of time in which to activate various real-time negotiation features of the real-time negotiation system 240.

For example, the seller 505 may provide one or more inputs into the schedule configuration interface 605 that cause the real-time negotiation system 240 to automatically distribute adjustments to item listings based on an input into the automated adjustment interface 610, during periods of time defined by the schedule configuration interface 605.

The seller 505 may define an automatic adjustment value to be distributed to one or more shoppers that have provided an input that represents an implicit interest in one or more items listed by the seller 505 through the automated adjustment interface 610. As an illustrative example, the seller 505 may provide an input that defines a percentage or fixed value into the automated adjustment interface 610. Upon detecting a signal indicating an implicit interest in an item listed by the seller 505, and based on the input that defines the percentage or fixed value into the automated adjustment interface 610, the real-time negotiation system 240 presents a display of an adjusted item listing to one or more shoppers that expressed the implicit interest in the item, wherein the adjustment to the item listing is based on the percentage or fixed value.

In some embodiments, the schedule configuration interface 605 may additionally function to define a schedule of availability for the seller to receive notifications, as discussed in operation 315 of the method 300. For example, the seller 505 may provide an input that defines a schedule of availability into the schedule configuration interface 605, wherein notifications, such as the notifications 715 of FIG. 7 discussed below, may only be received during a time period defined by the schedule of availability.

Figure 7:
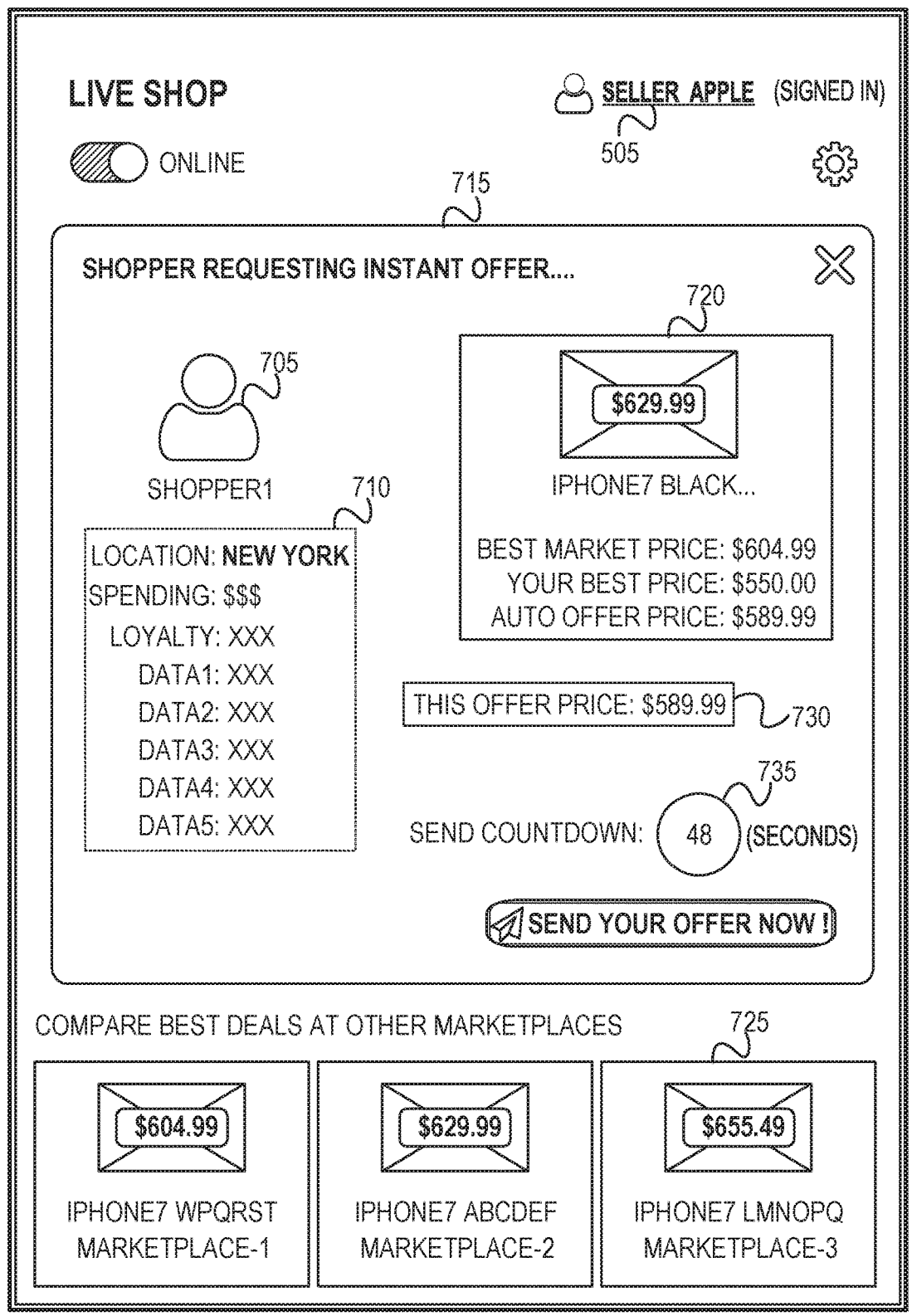
FIG. 7 is an interface diagram illustrating an interface presented by a real-time negotiation system, according to an example embodiment.

FIG. 7 is an interface diagram illustrating an interface 700 presented by a real-time negotiation system 240, according to an example embodiment. As seen in FIG. 7, the interface 700 includes a display of a notification 715 (or "prompt) displayed within a GUI of a seller 505, in response to detecting a signal indicating an implicit interest in an item from a shopper (e.g., the user 410 of the flow-diagram 400).

In some embodiments, the notification 715 may include a display of an identification 705 of the shopper, as well as one or more attributes 710 of the shopper (e.g., location, spending analysis, etc.). The notification 715 may also include a depiction of the item 720 that the shopper expressed the implicit interest in, as well as a comparison of similar items 725.

In some embodiments, the notification may include an adjustment field 730 for the seller 505 to provide an input defining an adjustment to one or more attributes of an item listing, as well as a timer interface 735 to enable the seller 505 to define a period of time which a shopper has to respond to an offer based on the adjustment. The seller 505 may provide an adjustment to a corresponding item listing into the adjustment field 730, and send the adjusted item listing to the shopper for review.

Figure 8:
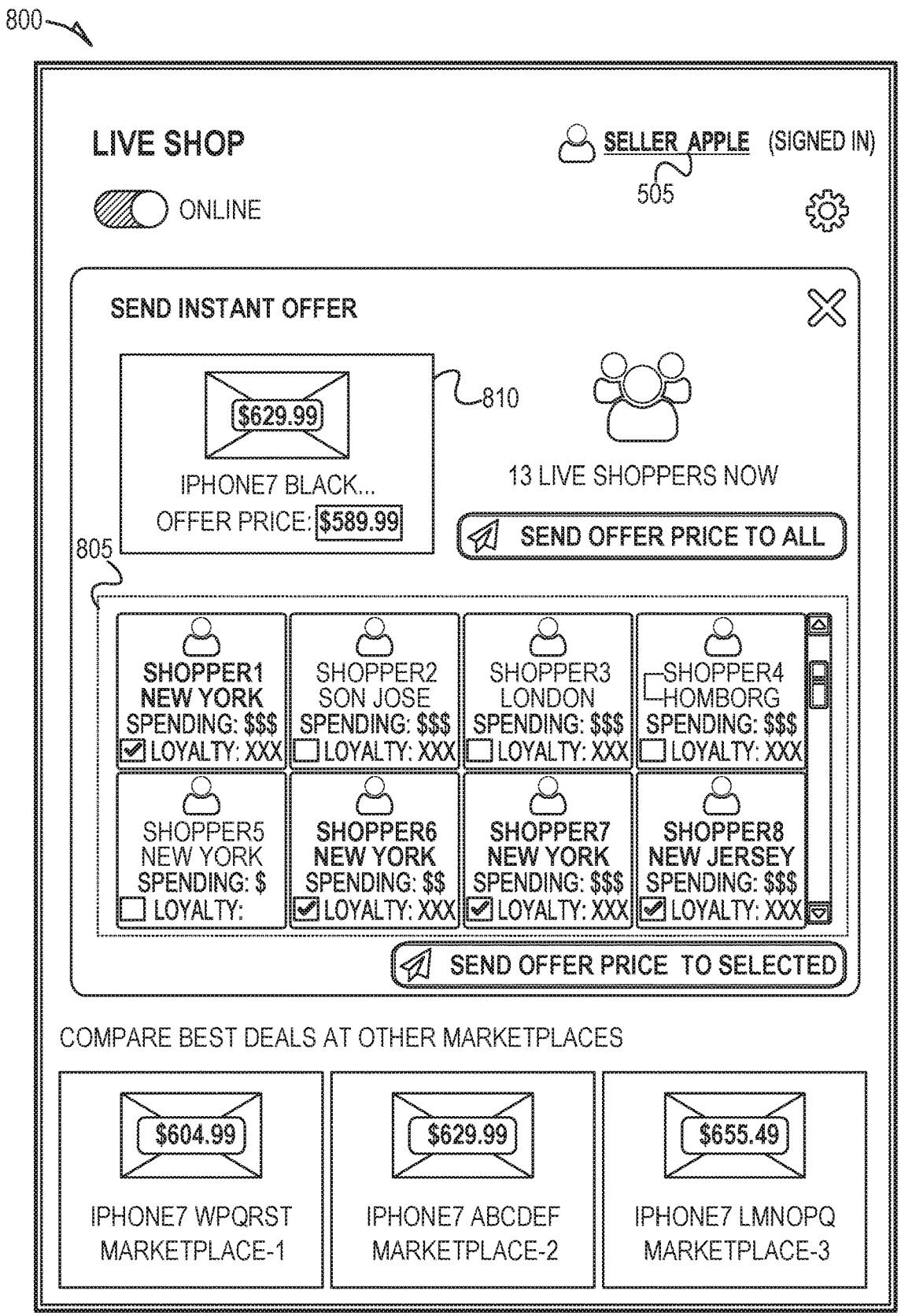
FIG. 8 is an interface diagram illustrating an interface presented by a real-time negotiation system, according to an example embodiment.

FIG. 8 is an interface diagram illustrating an interface 800 presented by a real-time negotiation system 240, according to an example embodiment. In some embodiments, the interface 800 may be presented to a seller (e.g., the seller 505) in response to the seller selecting the indication 525, of the number of shoppers that expressed an implicit interest in an item corresponding to an item depicted by an item listing of the seller 505.

For example, the interface 800 includes a display of a set of shopper 805 that have expressed an implicit interest in an item depicted by the item listing 810. The seller 505 may select one or more of the shoppers from among the set of shoppers 805 to distribute an adjustment to the item listing 810. The display of the set of shoppers 805 may also include a presentation of user attributes of the shoppers 805, including a user identifier, a location, as well as a reputation score.

Figure 9:
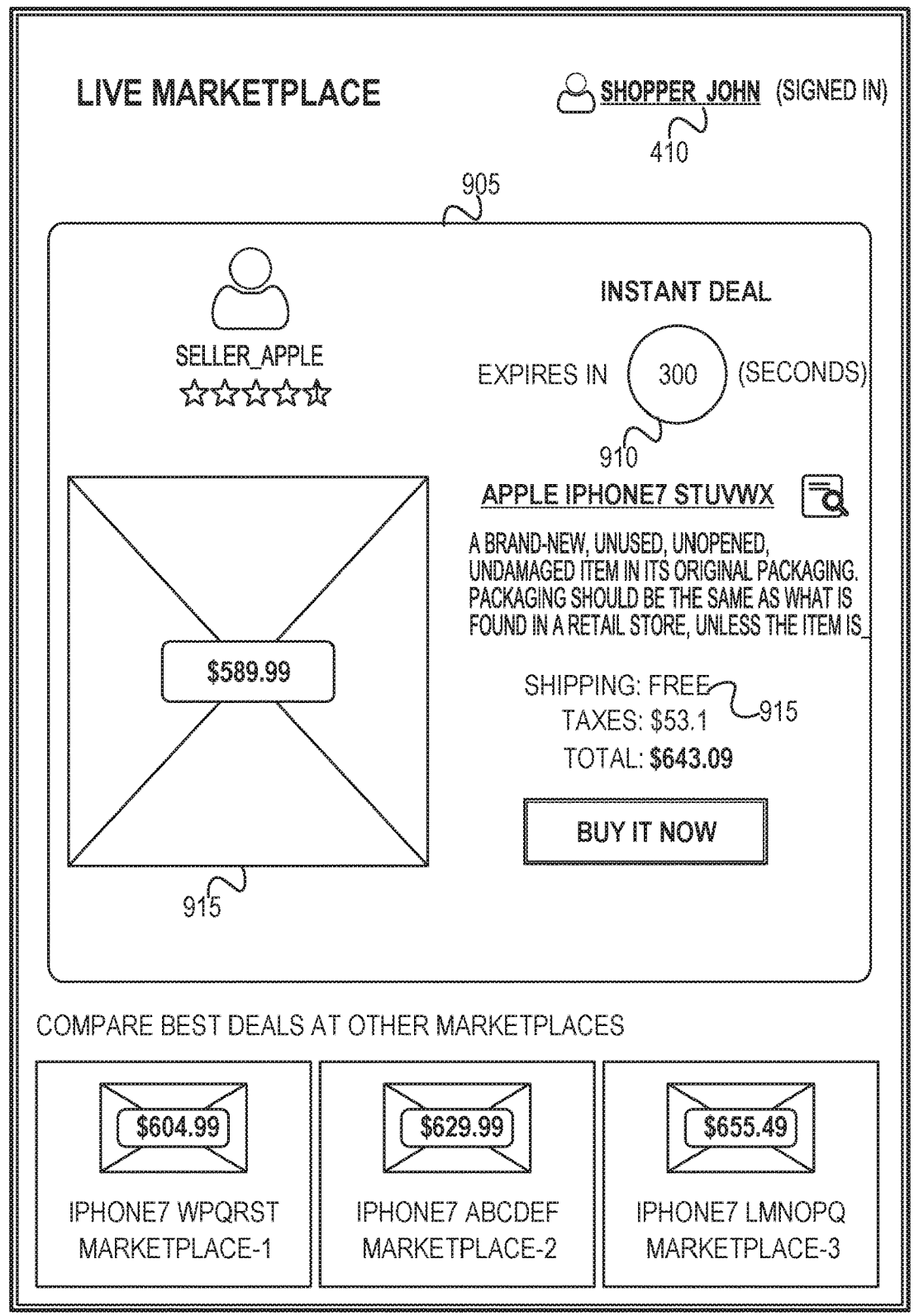
FIG. 9 is an interface diagram illustrating an interface presented by a real-time negotiation system, according to certain example embodiments.

FIG. 9 is an interface diagram illustrating an interface 900 presented by a real-time negotiation system 240, according to certain example embodiments. The interface 900 includes a display of an adjusted item listing 905 (e.g., an offer) to a shopper (e.g., the user 410 of the flow-diagram 400), based on an adjustment received from a seller (e.g., the seller 505), as discussed in operations of the method 300.

In some embodiments, the adjusted item listing 905 includes a display of a timer 910, wherein the timer 910 provides a period of time for a shopper to accept, reject, provide a counter-offer, or ignore the adjusted item listing 905. The adjusted item listing 905 may also include a display of one or more adjusted item attributes 915, based on an adjustment received from a corresponding seller (e.g., the seller 505).

In some embodiments, the interface 900 may also include one or more contact options to facilitate communication between the seller associated with the adjusted item listing 905 and a user. For example, the one or more contact options may include a chat or text interface, an audio based chat feature, as well as a video chat feature.

Figure 10:
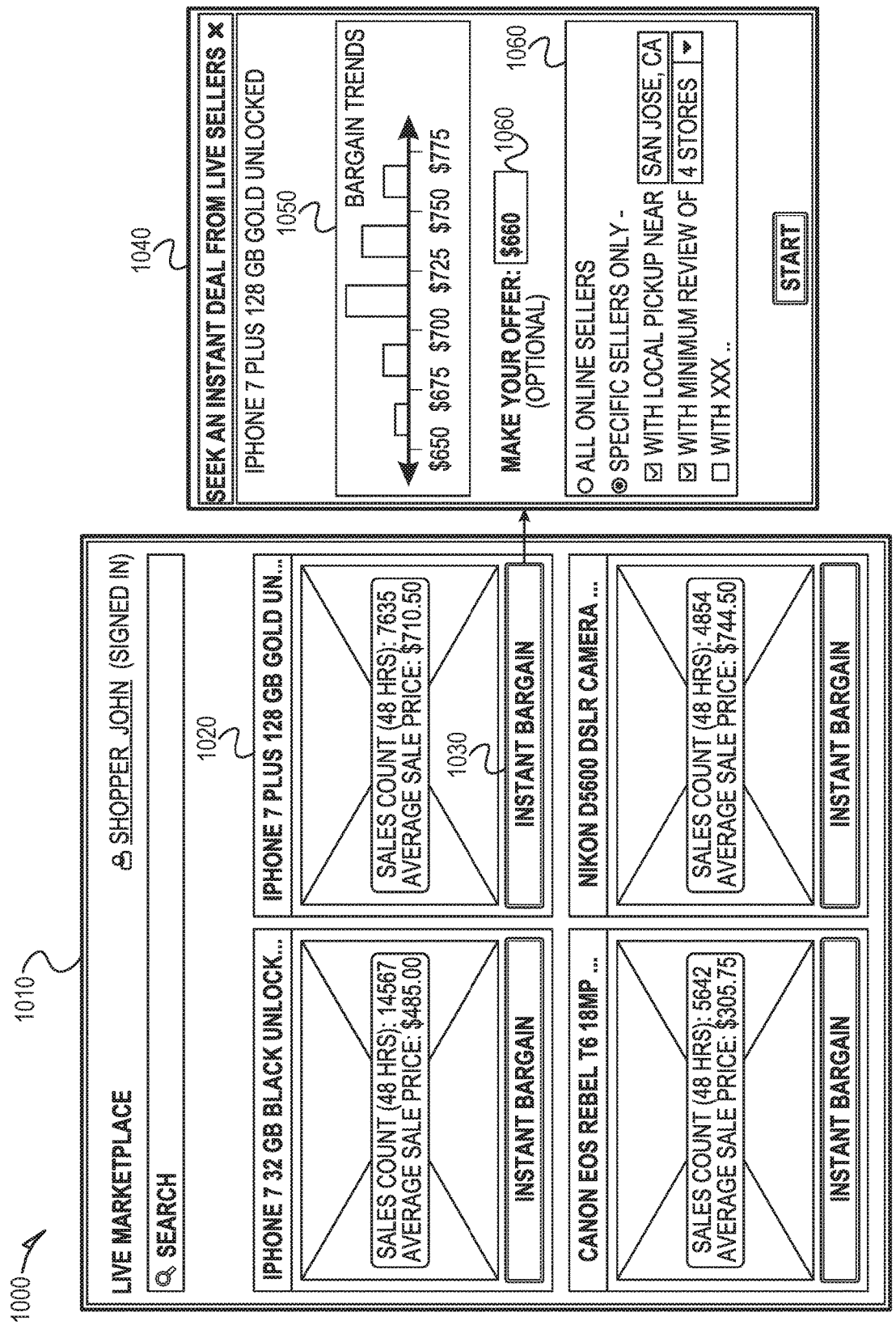
FIG. 10 is an interface diagram illustrating an interface presented by a real-time negotiation system, according to certain example embodiments.

FIG. 10 is an interface diagram illustrating an interface diagram 1000 depicting a live marketplace interface 1010 presented by a real-time negotiation system 240, according to certain example embodiments. According to certain example embodiments, the live marketplace interface 1010 may be displayed to a shopper (e.g., the user 410 of the flow-diagram 400) in response to receiving the signal indicating the implicit interest in an item (e.g., in operation 305 of the method 300) from the shopper. As seen in FIG. 10, the live marketplace interface 1010 comprises a presentation of a set of item listings (e.g., item listing 1020) that depict one or more items corresponding to the implicit interest in the item or item attribute received from the user, associated with sellers that have opted into the real-time negotiation feature of the real-time negotiation system 240.

For example, in response to detecting the implicit interest in the item (or item attribute), the identification module 210 identifies one or more item listing that depict an item related to the implicit interest, from sellers that have opted into the real-time negotiation feature, and causes display of a presentation of the one or more item listings within the live marketplace interface 1010 to the shopper.

The shopper may provide inputs into the interface 1010 to generate and distribute offers to one or more corresponding sellers associated with the item listings in real-time. For example, the shopper may provide an input to select one or more item listings from among the presentation of item listings displayed within the live marketplace interface 1010, provide an input that defines an offer value (e.g., a price, local pickup or delivery), and distribute the offer to the sellers associated with the one or more selected item listings. The sellers may thereby review the offers in real-time.

For example, the shopper may select a graphical icon 1030 displayed within a portion of an item listing, and in response, the real-time negotiation system 240 may present an instant deal interface 1040 to the shopper. The instant deal interface 1040 may comprise a display of a visualization 1050 of sales statistics relevant to the item, as well as one or more offer configuration fields 1060, that the shopper may use to provide inputs defining an offer to one or more sellers.

In some embodiments, in response to receiving the selection of the graphical icon 1030 that corresponds to the item listing 1020, the real-time negotiation system 240 accesses a database that comprises final sale prices of other item listings for similar items. For example, the real-time negotiation system 240 may access the database and retrieve final sale prices over a predefined period of time (e.g., a week, a month, a year) for an item identified by the item listing 1020. In some embodiments, the shopper may provide an input to define a time period, and the real-time negotiation system 240 may update the visualization 1050 displayed within instant deal interface 1040 accordingly.

In some instances, it is expected that the initial shopper who implicitly expressed interest in the product and to whom an instant deal is provided may not accept the deal within the predetermined time period. An example of non-acceptance may be that the shopper simply fails to reply to the deal offer or alternatively explicitly declines the offer. In such instances, the seller may then broadcast the instant deal to the public or some broader group of shoppers outside of the initial shoppers who received the offer.

For instance, if one of the shoppers in FIG. 8 fails to accept the deal presented by Seller Apple 505, Seller Apple 505 is then presented with the option of broadcasting the offer to all shoppers on the online marketplace. Such broadcast may be presented on a designated webpage to capture all such instant deals, such as that shown in FIG. 10. While FIG. 10 is from the perspective of a particular shopper (i.e., Shopper John), such a page would be accessible to any user of the online market place to see.

In some embodiments, the instant deal that is broadcasted to the public may also be time bound by an expiration period, such as the expiration period 910 of FIG. 9. This expiration period may be a duration remaining from the original time period presented to the initial shopper, or alternatively may comprise a stand-alone time period that is added to the original time period presented to the initial shopper. For illustrative purposes, consider the expiration period 910 of FIG. 9. Upon the expiration of the initial 300 second period presented to the shopper (Shopper John 410), an additional time period may be presented (e.g., 200 seconds), giving the additional online marketplace shoppers the opportunity to take advantage of the instant deal.

Figure 11:
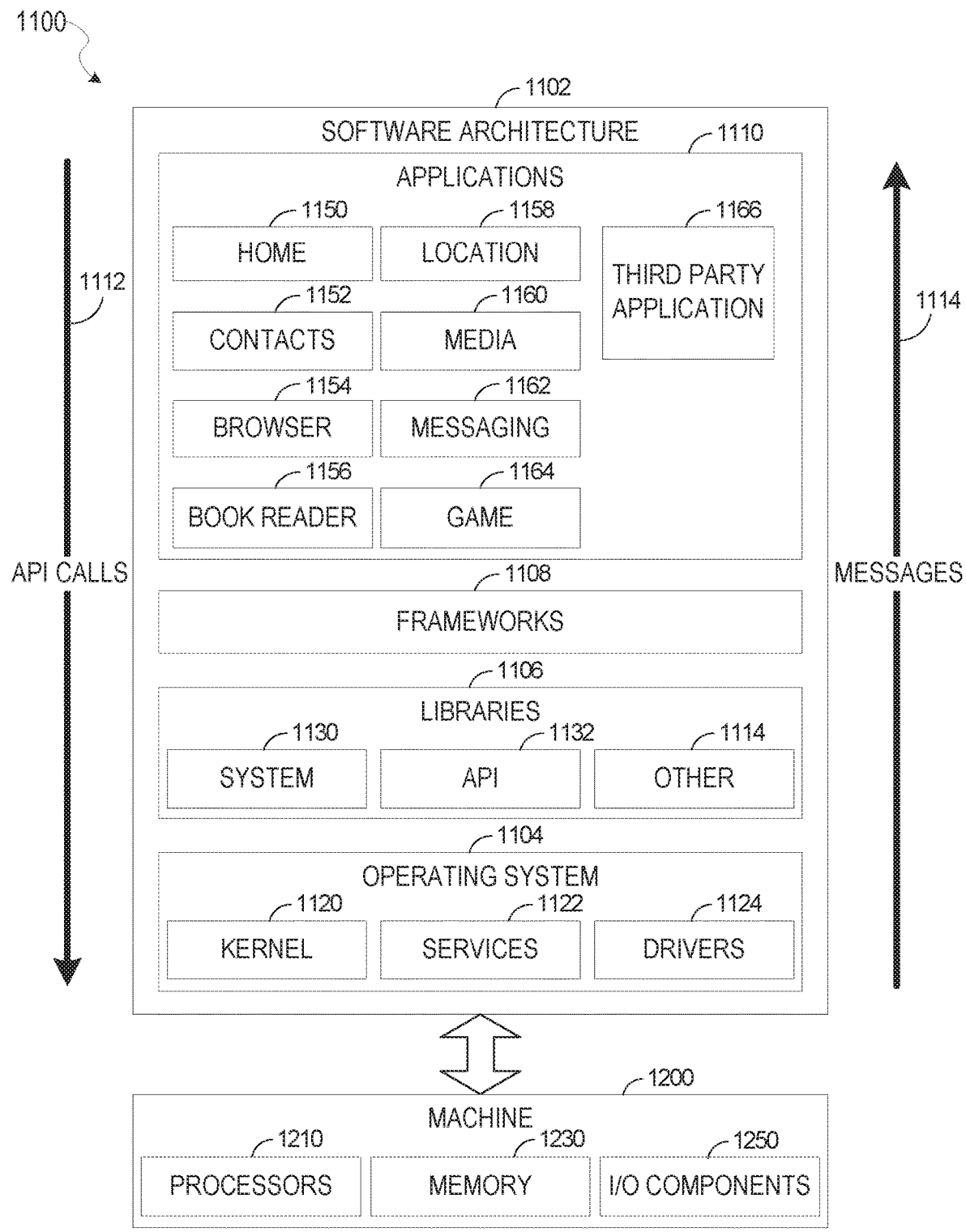
FIG. 11 is a block diagram illustrating an architecture of software, which can be installed on any one or more of the devices described herein, according to an example embodiment.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1166 can invoke the API calls 1112 provided by the operating system 1104 to facilitate functionality described herein.

Figure 12:
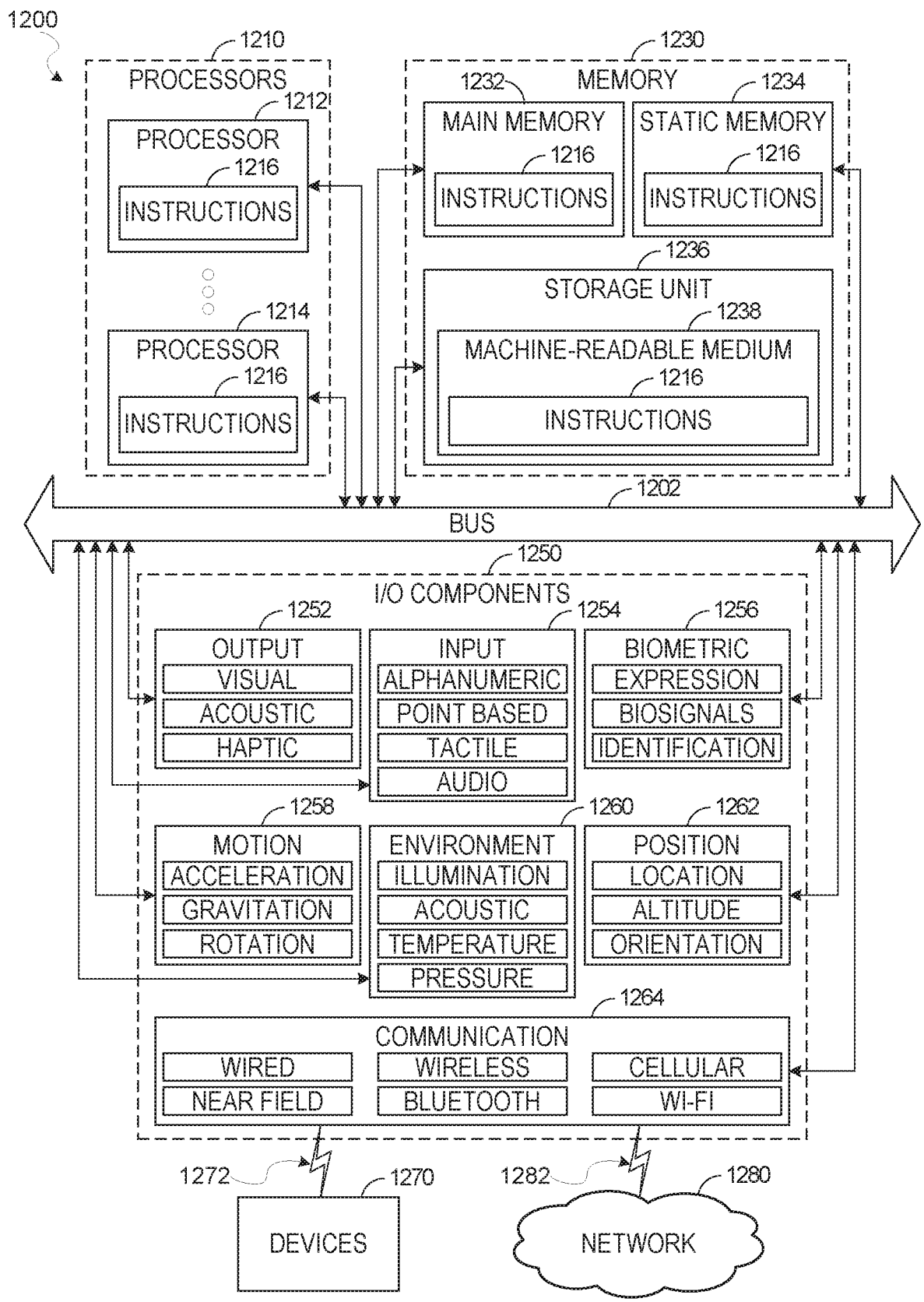
FIG. 12 illustrates a diagrammatic representation of a machine in the form of a computer system within which a set of instructions may be executed for causing the machine to perform any one or more of the methodologies discussed herein, according to an example embodiment.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions 1216 may cause the machine 1200 to execute the method 1200 of FIG. 12. Additionally, or alternatively, the instructions 1216 may implement FIGS. 3-7, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, both accessible to the processors 1210 such as via the bus 1202. The main memory 1230, the static memory 1234, and storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

The various memories (i.e., 1230, 1232, 1234, and/or memory of the processor(s) 1210) and/or storage unit 1236 may store one or more sets of instructions and data structures (e.g., software) embodying or utilized by any one or more of the methodologies or functions described herein. These instructions, when executed by processor(s) 1210 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of operating a system having one or more processors and memory associated with the one or more processors, the method comprising:
   receiving from a first device having a first location attribute:
      a signal indicating an implicit interest in a first item, the first item having item attributes; and
      a location radius associated with the first location attribute;
   determining a second location attribute of a second device;
   determining a third location attribute of a third device;
   comparing both the second location attribute and the third location attribute with the first location attribute;
   selecting the second device and the third device based on the comparison;
   providing to both the second device and the third device a first user interface configured to receive user inputs indicating a preference to participate in real-time negotiations;
   receiving a first user input from the second device and a second user input from the third device, the first user input and the second user input both indicating selection of the preference to participate in the real-time negotiations;
   identifying a plurality of pages based on at least the item attributes of the first item, in response to the signal indicating the implicit interest in the first item, the plurality of pages including:
      a page, provided by the second device, that is associated with a second item that shares one or more of the item attributes of the first item;
      a distinct page, provided by the third device, that is associated with a third item that shares one or more of the item attributes of the first item;
   providing a second user interface at each of the second device and the third device that includes a prompt at the second device and the third device in response to the identifying the plurality of pages based on the implicit interest in the first item, the prompt comprising a request to provide an adjustment to a value associated with the second item and the third item respectively, the prompt in the second user interface being provided in response to the second and third users providing the inputs indicating the preference to participate in the real-time negotiations;
   selecting the second item based on an evaluation of the adjustment to the value of the second item received from the second device; and
   causing presentation of a display of the second item to the first user via the first device, the display based on the adjustment to the value of the second item.

2. The method of claim 1, wherein the causing display of the prompt at the second device includes:
   causing display of the prompt during a time that the second user of the second device has indicated availability.

3. The method of claim 1, wherein the prompt includes a period within which the second user can reply.

4. The method of claim 1, wherein the first user is presented with an option to chat with an individual associated with the second page via at least one of text, audio or video.

5. A system comprising:
one or more processors; and
a non-transitory memory storing instructions that configure the one or more processors to perform operations comprising:
  receiving from a first device having a first location attribute:
    a signal indicating an implicit interest in a first item, the first item having item attributes; and
    a location radius associated with the first location attribute;
  determining a second location attribute of a second device;
  determining a third location attribute of a third device;
  comparing both the second location attribute and the third location attribute with the first location attribute;
  selecting the second device and the third device based on the comparison;
  providing to both the second device and the third device a first user interface configured to receive user inputs indicating a preference to participate in real-time negotiations;
  receiving a first user input from the second device and a second user input from the third device, the first user input and the second user input both indicating selection of the preference to participate in the real-time negotiations;
  identifying a plurality of pages based on at least the item attributes of the first item, in response to the signal indicating the implicit interest in the first item, the plurality of pages including:
    a page, provided by the second device, that is associated with a second item that shares one or more of the item attributes of the first item;
    a distinct page, provided by the third device, that is associated with a third item that shares one or more of the item attributes of the first item;
  providing a second user interface at each of the second device and the third device that includes a prompt at the second device and the third device in response to the identifying the plurality of pages based on the implicit interest in the first item, the prompt comprising a request to provide an adjustment to a value associated with the second item and the third item respectively, the prompt in the second user interface being provided in response to the second and third users providing the inputs indicating the preference to participate in the real-time negotiations;
  selecting the second item based on an evaluation of the adjustment to the value of the second item received from the second device; and
  causing presentation of a display of the second item to the first user via the first device, the display based on the adjustment to the value of the second item.

6. The system of claim 5, wherein the causing display of the prompt at the second device includes:
  causing display of the prompt during a time that the second user of the second device has indicated availability.

7. The system of claim 5, wherein the prompt includes a period within which the second user can reply.

8. The system of claim 5, wherein the first user is presented with an option to chat with are individual associated with the second page via at least one of text, audio or video.

9. A non-transitory machine-readable storage medium including instructions that, when executed by a machine, cause the machine to perform operations comprising:
  receiving from a first device having a first location attribute:
    a signal indicating an implicit interest in a first item, the first item having item attributes; and
    a location radius associated with the first location attribute;
  determining a second location attribute of a second device;
  determining a third location attribute of a third device;
  comparing both the second location attribute and the third location attribute with the first location attribute;
  selecting the second device and the third device based on the comparison;
  providing to both the second device and the third device a first user interface configured to receive user inputs indicating a preference to participate in real-time negotiations;
  receiving a first user input from the second device and a second user input from the third device, the first user input and the second user input both indicating selection of the preference to participate in the real-time negotiations;
  identifying a plurality of pages based on at least the item attributes of the first item, in response to the signal indicating the implicit interest in the first item, the plurality of pages including:
    a page, provided by the second device, that is associated with a second item that shares one or more of the item attributes of the first item;
    a distinct page, provided by the third device, that is associated with a third item that shares one or more of the item attributes of the first item;
  providing a second user interface at each of the second device and the third device that includes of a prompt at the second device and the third device in response to the identifying the plurality of pages based on the implicit interest in the first item, the prompt comprising a request to provide an adjustment to a value associated with the second item and the third item respectively, the prompt in the second user interface being provided in response to the second and third users providing the inputs indicating the preference to participate in the real-time negotiations;
  selecting the second item based on an evaluation of the adjustment to the value of the second item received from the second device; and
  causing presentation of a display of the second item to the first user via the first device, the display based on the adjustment to the value of the second item.

10. The non-transitory machine-readable storage medium of claim 9, wherein the causing display of the prompt at the second device includes:
  causing display of the prompt during a time that the second user of the second device has indicated availability.

11. The non-transitory machine-readable storage medium of claim 9, wherein the prompt includes a period within which the second user can reply.

12. The non-transitory machine-readable storage medium of claim 9, wherein the first user is presented with an option to chat with an individual associated with the second page via at least one of text, audio or video.

* * * * *